United States Patent
Basu et al.

(10) Patent No.: US 12,361,320 B2
(45) Date of Patent: Jul. 15, 2025

(54) COGNITIVE DISAMBIGUATION FOR PROBLEM-SOLVING TASKS INVOLVING A POWER GRID USING RELEVANCE FEEDBACK

(71) Applicant: Utopus Insights, Inc., Valhalla, NY (US)

(72) Inventors: Chumki Basu, Karnataka (IN); Ashish Verma, Bangalore (IN)

(73) Assignee: Utopus Insights, Inc., Valhalla, NY (US)

( * ) Notice: Subject to any disclaimer, the term of this patent is extended or adjusted under 35 U.S.C. 154(b) by 0 days.

(21) Appl. No.: 17/454,976

(22) Filed: Nov. 15, 2021

(65) Prior Publication Data

US 2022/0215290 A1 Jul. 7, 2022

Related U.S. Application Data

(63) Continuation of application No. 14/942,147, filed on Nov. 16, 2015, now Pat. No. 11,176,479.

(51) Int. Cl.
*G06N 20/00* (2019.01)
*G06N 5/025* (2023.01)

(52) U.S. Cl.
CPC ............ *G06N 20/00* (2019.01); *G06N 5/025* (2013.01)

(58) Field of Classification Search
CPC .............................. G06N 20/00; G06N 5/025
See application file for complete search history.

(56) References Cited

U.S. PATENT DOCUMENTS

| 6,865,302 B2 | 3/2005 | Chang |
| 7,120,880 B1 | 10/2006 | Christopher et al. |
| 7,987,170 B2 | 7/2011 | Hirst |
| 8,972,066 B2 | 3/2015 | Anderson et al. |

(Continued)

OTHER PUBLICATIONS

Yin, Peng-Yeng, and Shin-Huei Li. "Content-based image retrieval using association rule mining with soft relevance feedback." Journal of Visual Communication and Image Representation 17.5 (2006): 1108-1125. (Year: 2006).*

(Continued)

*Primary Examiner* — Kevin W Figueroa
(74) *Attorney, Agent, or Firm* — Ahmann Kloke LLP

(57) ABSTRACT

Methods, systems, and computer program products for cognitive disambiguation of problem-solving tasks involving a power grid are provided herein. A computer-implemented method includes capturing user feedback pertaining to relevance of remote terminal unit measurements related to a grid event through user interface interactions carried out by the user, wherein the user interface is communicatively linked to at least one computing device; automatically inferring rules related to the grid event to curate remote terminal unit measurements across iterations of analysis by recognizing irrelevant data and/or distractions in a visual display associated with the user interface, wherein said automatically inferring comprises implementing machine learning via the at least one computing device based on the user feedback; and outputting candidate solutions to a problem-solving task involving the grid based on the inferred rules, wherein said outputting is carried out by the at least one computing device.

15 Claims, 3 Drawing Sheets

(56) References Cited

U.S. PATENT DOCUMENTS

| | | | |
|---|---|---|---|
| 2014/0148962 A1 | 5/2014 | Venayagamoorthy et al. | |
| 2014/0316743 A1 | 10/2014 | Drees et al. | |
| 2015/0186547 A1 | 7/2015 | Byrne et al. | |
| 2015/0195417 A1 | 7/2015 | Ohhashi | |
| 2017/0261951 A1* | 9/2017 | Bandara | G06Q 50/06 |

OTHER PUBLICATIONS

Zhang, Peng. Advanced industrial control technology. William Andrew, 2010. (Year: 2010).*

Vanfretti, Luigi, Sebastian Bengtsson, and Jan O. Gjerde. "Preprocessing synchronized phasor measurement data for spectral analysis of electromechanical oscillations in the Nordic Grid." International Transactions on Electrical Energy Systems 25.2 (2015): 348-358. (Year: 2013).*

Hwang, Inseok, et al. "A survey of fault detection, isolation, and reconfiguration methods." IEEE transactions on control systems technology 18.3 (2009): 636-653. (Year: 2009).*

Basu et al. Understanding Events for Wide-Area Situational Awareness, ISGT NA, 2014.

Buneman et al. Curated Databases, PODS'08, Jun. 9-12, 2008.

Mayfield et al. Information Retrieval on the Semantic Web: Integrating Inference and Retrieval, in Proceedings of the Semantic Web: Integrating Inference and Retrieval, in Proceedings of the Semantic Web Workshop at SIGIR—2003, Toronto, Canada, Aug. 2003.

Oerlemans, Ard, Joachim T. Rijsdam, and Michael S. Lew. "Real-time object tracking with relevance feedback." Proceedings of the 6th ACM international conference on Image and video retrieval. 2007. (Year: 2007).

Renee Miller et al. Big Data Curation, DIMACS Workshop on Big Data Integration, Rutgers University, Jun. 21, 2013.

Rui et al. Relevance Feedback: A Power Tool for Interactive Content-Based Image Retrieval, IEEE Transactions on Circuits and Video Technologies, 8 (5), pp. 644-655, 1998.

Salton et al. Improving Retrieval Performance by Relevance Feedback, Journal of the American Society for Information Science, vol. 41, Issue 4, pp. 288-297, Jun. 1990.

* cited by examiner

COGNITIVE DISAMBIGUATION FOR PROBLEM-SOLVING TASKS INVOLVING A POWER GRID USING RELEVANCE FEEDBACK

CROSS-REFERENCE TO RELATED APPLICATIONS

This application is a continuation of U.S. patent application Ser. No. 14/942,147, filed on Nov. 16, 2015, and entitled "COGNITIVE DISAMBIGUATION FOR PROBLEM-SOLVING TASKS INVOLVING A POWER GRID USING RELEVANCE FEEDBACK", which is incorporated herein by reference in its entirety.

FIELD OF THE INVENTION

The present application generally relates to information technology, and, more particularly, to power grid management technology.

BACKGROUND

High-throughput, low-latency sensor data from remote terminal units (RTUs), such as phasor measurement units (PMUs), can overwhelm grid operators and/or engineers with considerable amounts of irrelevant data. Moreover, existing analysis approaches fail to remedy such inefficiencies.

SUMMARY

In one embodiment of the present invention, techniques for cognitive disambiguation for problem-solving tasks involving a power grid are provided. An exemplary computer-implemented method can include steps of capturing user feedback pertaining to relevance of one or more remote terminal unit measurements related to a grid event through one or more user interface interactions carried out by the user, wherein the user interface is communicatively linked to at least one computing device; automatically inferring one or more rules related to the grid event to curate remote terminal unit measurements across one or more iterations of analysis by recognizing one or more items of irrelevant data and/or one or more distractions in a visual display associated with the user interface, wherein automatically inferring comprises implementing machine learning via the at least one computing device based on the user feedback; and outputting one or more candidate solutions to a problem-solving task involving the grid based on the one or more inferred rules, wherein outputting is carried out by the at least one computing device.

In another embodiment of the invention, an exemplary computer-implemented method for use with a user interface to be used in one or more problem-solving tasks can include steps of capturing user feedback pertaining to relevance of one or more remote terminal unit measurements related to a grid event through one or more user interactions performed on the user interface, wherein the user interface is communicatively linked to at least one computing device. The method can also include automatically inferring one or more rules related to the grid event to curate remote terminal unit measurements across one or more iterations of analysis by recognizing one or more items of irrelevant data and/or one or more distractions in a visual display associated with the user interface, wherein automatically inferring comprises implementing machine learning via the at least one computing device based on the user feedback. Further, the method can include outputting the one or more inferred rules for user validation via the user interface, outputting one or more candidate solutions to one of the one or more problem-solving tasks based on the one or more inferred rules subsequent to the user validation, wherein outputting is carried out by the at least one computing device, and storing the one or more inferred rules, subsequent to the user validation, in a knowledge base communicatively linked to the at least one computing device.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an example embodiment of the present invention includes cognitive disambiguation in the power grid that combines relevance feedback with automated inferencing. One or more embodiments of the invention include augmenting the cognitive capabilities of the end-user for curating rules to update a knowledge base by inferring new rules based on interactions with the visual display of a user interface.

At least one embodiment of the invention includes incorporating relevance feedback into post-event analysis via one or more mechanisms. Such mechanisms can include, for example, implementing rule adaptation. Via the incorporation of relevance feedback, a grid operator and/or engineer can alter the output of an inference engine which resolves ambiguities.

Accordingly, as detailed herein, one or more embodiments include automating a data curation process in power grids by using user (such as an operator and/or an engineer) interactions as feedback, via machine learning, with automated inferencing of logical rules to resolve ambiguities on the grid. Such an embodiment can further include automatically inferring data curation rules and updating a knowledge base with the learned rules following user-validation. Additionally, such an embodiment can also include capturing and representing an intention of a user while performing actions on a user interface, translating and/or mapping user action to a logical assertion that expresses the semantics of the intention, and using logical reasoning (such as unification, chaining, etc.) to infer new facts from the union of assertions.

As also described herein, at least one embodiment of the invention includes inferring the relevance of a set of synchronized RTU measurements associated with system objects (such as events) to a specific task (such as fault localization) by how the user interacts with those measurements. For example, measurements from PMU sensors and/or devices deployed on the transmission grid are one type of RTU measurement that can be implemented in connection with one or more embodiments of the invention.

Figure 1:
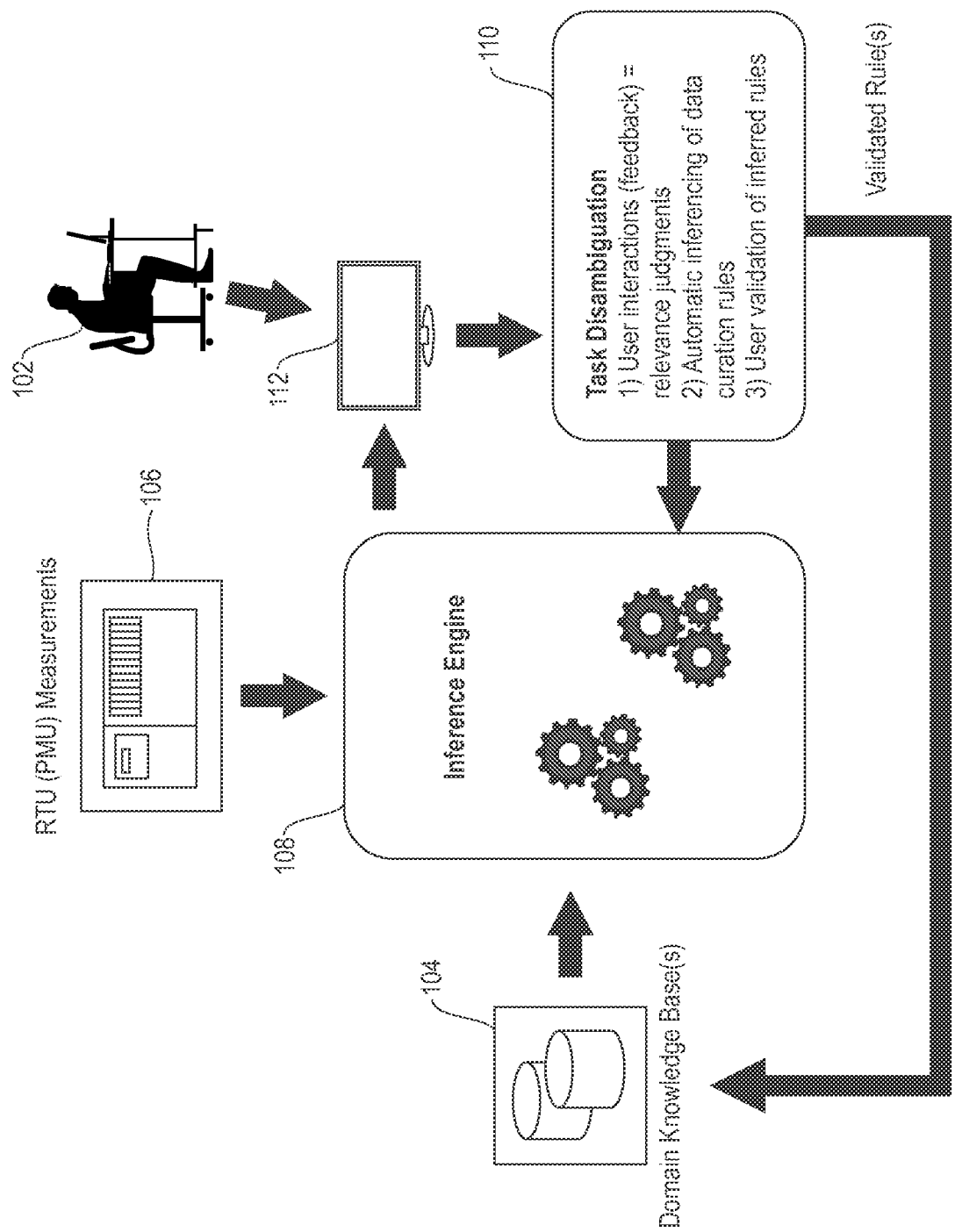
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a user 102 (such as a grid operator and/or engineer), a domain knowledge base 104, an RTU 106, an inference engine 108, and a computing device user interface 112. In FIG. 1, RTU measurements 106 from the grid and domain rules encoded by one or more users and captured in the domain knowledge base 104 are input to the inference engine 108. Asserted facts are output to computing device user interface 112. Asserted facts are combined with user interactions, wherein all are inputs to a disambiguation component 110. In one or more embodiments of the invention, candidate solutions are provided by fired rules to power systems analysts for feedback.

As illustrated in FIG. 1, at least one embodiment of the invention includes learning and validating rules about a power system derived from event data over one or more iterations by interacting with associated RTU measurement data via a user interface. Each user interaction can include, as its object, a measurement, m, which has a corresponding PMU device, p, and a corresponding location, 1. An interaction can be translated into one or more assertions about the relevance of p and/or 1 for a problem-solving task. By way of example, a sample interaction that can be repeated across multiple events may include the following: a user turns off m=measurement in a visual display for p=A and location=1 for a set of events, E.

As also depicted, for example, in FIG. 1, at least one embodiment of the invention includes maintaining a knowledge base 104 of assertions about grid conditions at the time of an event. Such assertions are also referred to herein as situational assertions. An example situational assertion can include the occurrence of an event e2 at some location, 1, during an event, e1. One or more embodiments of the invention include applying (via inference engine 108, for example) one or more inference rules to all assertions, and inferring new facts related to a given problem-solving task. An example of an inference rule is as follows: If event e2 is observed in the system simultaneously with e1, then it is inferred that event e2 could not have occurred at location, 1. Inferred rules can additionally be logged, presented to a user (via computing device 112, for example) for validation (via disambiguation component 110, for example) at pre-determined intervals, and the knowledge base 104 can be updated upon validation.

Additionally, at least one embodiment of the invention includes outputting one or more recommended solutions to a user for solving a specific problem, as well as learning rules pertaining to the relevance (and consequently, value) of measurement data for a specific problem-solving task. Such a mechanism can be considered closed-loop feedback for an automated reasoning system.

One or more embodiments of the invention also include establishing a link, based on user interactions, between high-level user concepts pertaining to the domain and low-level features of objects in the domain. By way of example, there are potentially many low-level features of objects in any domain. A human being can plausibly filter the irrelevant features and focus on the relevant ones. Ultimately, a system-derived inference rule establishes the link between the user's mental representation of relevance and the objects presented in the visual display of the user interface. In text retrieval, at least one embodiment of the invention includes using relevance feedback to refine an initial query iteratively to better reflect the user's information need. Relevance feedback is utilized for text retrieval due, for example, to the inherent ambiguity of language (that is, the words used to express the query can be different from the words in the given document(s)). In image retrieval, an information need of the user may be expressed (via relevance feedback) as objects that are similar in shape, objects that are similar in color, objects that are similar in texture, etc.

At least one embodiment of the invention includes accepting an inexact query wherein the information need of the user may not be explicit. With relevance feedback, the user can refine this query by marking as "relevant" or "irrelevant" the items in a set of returned objects (documents or images). One or more embodiments of the invention do not include assessing the relevance of a set of returned objects (events) by how the user judges or scores a returned object (in the same way as marking a document or image). Rather, such embodiments of the invention include inferring the relevance of a set of synchronized measurements associated with an object (event) to a problem-solving task (such as fault localization) by how the user interacts with those measurements.

At least one embodiment of the invention includes translating a user action to one or more binary relevance judgments on a set of measurements with respect to a task. Such translating can be based, for example, on whether the data displayed are marked by the user as relevant or irrelevant to the task, and/or whether the user implements an action (turning off a PMU radio button, for instance) to record the irrelevance of a specific measurement from a displayed chart (or other data display). This user action is interpreted as indicating that the particular PMU measurement is not relevant to the task. Additionally, at least one embodiment of the invention includes applying an inference rule to conclude that if a measuring device provides a measurement and the user's interaction indicates that the measurement is not relevant to the task, then a low-level feature of the object (such as location) of the measuring device is also not relevant to the task.

Relevance feedback also provides implicit knowledge that can be utilized to infer new rules. For example, if a PMU is labelled non-relevant (NR), then one or more embodiments of the invention can include constraining the new inferences that can be derived in the current session to exclude this PMU. Similar to Boolean query reformulation, at least one embodiment of the invention can include constraining the inferencing by introducing a rule that if a location is in the NR set, then that location cannot be a candidate. Subsequently, the NR set is updated after receiving user feedback.

By way of illustration, consider the following use case for implementing relevance feedback and/or inferencing to localize faults. In this example use case, a disturbance or fault has occurred on the grid, and the impacts on the grid derived from the PMU data include the following: grid events of multiple types and at multiple locations on the grid that are recorded by power system devices. One or more of these events may be associated with power system faults.

In connection with such an example use case, at least one embodiment of the invention can include disambiguating one or more fault locations (on the grid). Such an embodiment can include, by way of example, the following end user actions. The end user notices some behavior (change in measurement) at (PMU) A, but also notices that no other PMUs behave similarly. Accordingly, the behavior at A is deemed an anomaly. The end-user subsequently implements an action of turning off the display of A's measurements in a corresponding chart, and provides feedback that A is not relevant. Because the end user does not see any significant changes in measurement for the remaining PMUs, the end user repeats the action and turns off the display of the PMU with the smallest deviation from its baseline (because this PMU is impacted the least by the disturbance). This step can be repeated, for example, until significant changes in measurement (with respect to a baseline) at one or more PMUs become visible. In an example scenario wherein, for example, there may be multiple PMUs where changes are visible, at least one embodiment of the invention recommends more than one disturbance locations.

Additionally, continuing with the example use case detailed above, at least one embodiment of the invention can include curating RTU measurement data. By comparing data against multiple previous iterations, at least one embodiment of the invention can include learning that user action of turning off the display of A is always associated with a specific event type. Accordingly, with high confidence, a new logical rule can be inferred as follows: If an event of type "a" is observed, then A is not a candidate fault location. This reduces the value or relevance of specific groups of measurements for A when events of a certain type are observed in the power system, thereby enabling data curation.

At least one embodiment of the invention also includes presenting the new rule (as noted above) to the user for validation. If the ground truth includes, for example, that A exhibits changes in behavior for some measurement with high probability when there is an event of type "a," the user accepts the learned rule. In such an instance, at least one embodiment of the invention includes updating a knowledge base with the new (verified) rule, and reducing the value of a specific measurements pertaining to A data for the fault location task.

Accordingly, as detailed above, one or more embodiments of the invention include using a relevance feedback and inferencing method to learn conditional statements (if-then rules) that mimic human cognitive processes. Also, as further described herein, at least one embodiment of the invention includes implementing semantics to capture the intent of the user while performing an action, translating and/or mapping each user action via the interface to a logical assertion that expresses these semantics, and combining this logical assertion with situational assertions (such as, for example, facts about the grid data) specific to the objects (events) being analyzed.

Accordingly, at least one embodiment of the invention includes recording assertions for a problem-solving task and combining such assertions with situational assertions. In carrying out such a process, a user can select a temporal period (for example, a 24 hour period) for retrieval of all system events. The user can select one of the returned events, and an example embodiment of the invention includes asserting that the selected event is relevant to the particular task in question. At least one embodiment of the invention can also include asserting one or more facts pertaining to the grid state captured by PMU devices during the selected event.

Additionally, the user can adjust a zoom level on a display/chart (to adjust the selected time period), and thereby an example embodiment of the invention includes asserting that the adjusted time period is relevant to the task in question. The user can additionally turn off the display of a measurement for a PMU (for example, on a chart), and thereby an example embodiment of the invention includes asserting that the measurement of this PMU is not relevant to the task in question. In at least one embodiment of the invention, the user can also redisplay the PMU measurement, and thereby an example embodiment of the invention includes removing the assertion that the PMU measurement is not relevant to the task in question.

As also detailed herein, one or more embodiments of the invention includes learning rules by determining patterns in assertions over multiple iterations of the same problem-solving task. For each task iteration, at least one embodiment of the invention includes recording assertions pertaining to PMU measurements that are not relevant to the task in question (not(X, "relevant")). Additionally, such an embodiment can also include defining a general purpose rule and applying unification from asserted facts and modus ponens to infer that a PMU (A, for example) is not a candidate solution. Such action can be implemented, for example, as follows: not(X, "relevant")→not(candidate(X, Y)); and substitute X="A," Y="problem solution."

By comparing with assertions recorded from multiple previous task iterations, at least one embodiment of the invention can include recognizing the co-occurrence of two assertions: a situational assertion about the state of the grid (such as "event(S, B)," for example, wherein S represents grid state and B represents event type), and an assertion associated with a user action (such as "not(A, "relevant")," for example). Based on such recognition, an example embodiment of the invention can also include learning an association rule between a situational assertion and a user action. An example association rule can include the following: [situational assertion]: event(S, B)→[user action]: not (A, "relevant"). Further, such an embodiment of the invention can additionally include chaining of rules, such as, for example, event(S, B)→not(candidate(A, "problem solution")).

Figure 2:
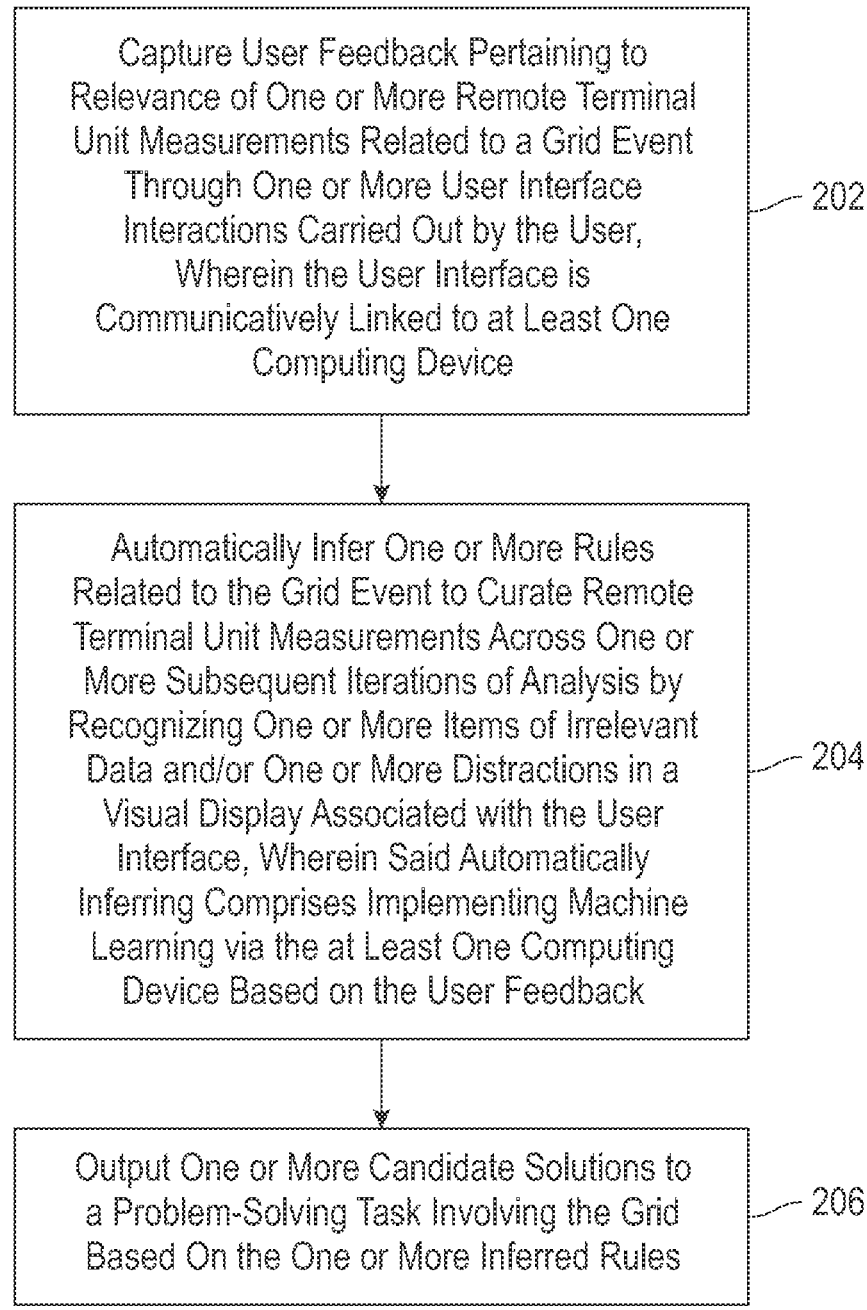
FIG. 2 is a flow diagram illustrating techniques according to an embodiment of the invention.

FIG. 2 is a flow diagram illustrating techniques according to an embodiment of the present invention. Step 202 includes capturing user feedback pertaining to relevance of one or more remote terminal unit measurements related to a grid event through one or more user interface interactions carried out by the user, wherein the user interface is communicatively linked to at least one computing device. At least one embodiment of the invention can also include logging the user feedback in a memory communicatively linked to the at least one computing device. Also, the user feedback can include, for example, turning off one or more measurements displayed via the user interface.

Step 204 includes automatically inferring one or more rules related to the grid event to curate remote terminal unit measurements across one or more subsequent iterations of analysis by recognizing one or more items of irrelevant data and/or one or more distractions in a visual display associated with the user interface, wherein said automatically inferring comprises implementing machine learning via the at least one computing device based on the user feedback. Automatically inferring can include automatically inferring the one or more rules across multiple iterations of the problem-solving task over multiple grid events.

Also, automatically inferring can include mapping the user feedback to one or more items of stored information, wherein the one or more items of stored information comprise one or more logical assertions that each express semantics of user intention associated with user feedback captured via the user interface. Further, at least one embodiment of the invention can include combining the one or more logical assertions with one or more situational assertions specific to the grid event.

Step 206 includes outputting one or more candidate solutions to a problem-solving task involving the grid based on the one or more inferred rules, wherein said outputting is carried out by the at least one computing device.

The techniques depicted in FIG. 2 can additionally include augmenting one or more cognitive capabilities of the user for curating one or more rules to update a knowledge base by inferring one or more new rules based on the one or more user interface interactions. Further, at least one embodiment of the invention can also include outputting the one or more inferred rules for user validation via the user interface, as well as updating a knowledge base with the one or more inferred rules subsequent to the user validation. At least one embodiment of the invention can further include maintaining a knowledge base of information related to grid conditions.

Also, an additional embodiment of the invention includes implementing a user interface for use in one or more problem-solving tasks, and capturing user feedback pertaining to relevance of one or more remote terminal unit measurements related to a grid event through one or more user interactions performed on the user interface, wherein the user interface is communicatively linked to at least one computing device. Such an embodiment can also include automatically inferring one or more rules related to the grid event to curate remote terminal unit measurements across one or more iterations of analysis by recognizing one or more items of irrelevant data and/or one or more distractions in a visual display associated with the user interface, wherein automatically inferring comprises implementing machine learning via the at least one computing device based on the user feedback. Further, such an embodiment can include outputting the one or more inferred rules for user validation via the user interface, outputting one or more candidate solutions to one of the one or more problem-solving tasks based on the one or more inferred rules subsequent to the user validation, wherein outputting is carried out by the at least one computing device, and storing the one or more inferred rules, subsequent to the user validation, in a knowledge base communicatively linked to the at least one computing device.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
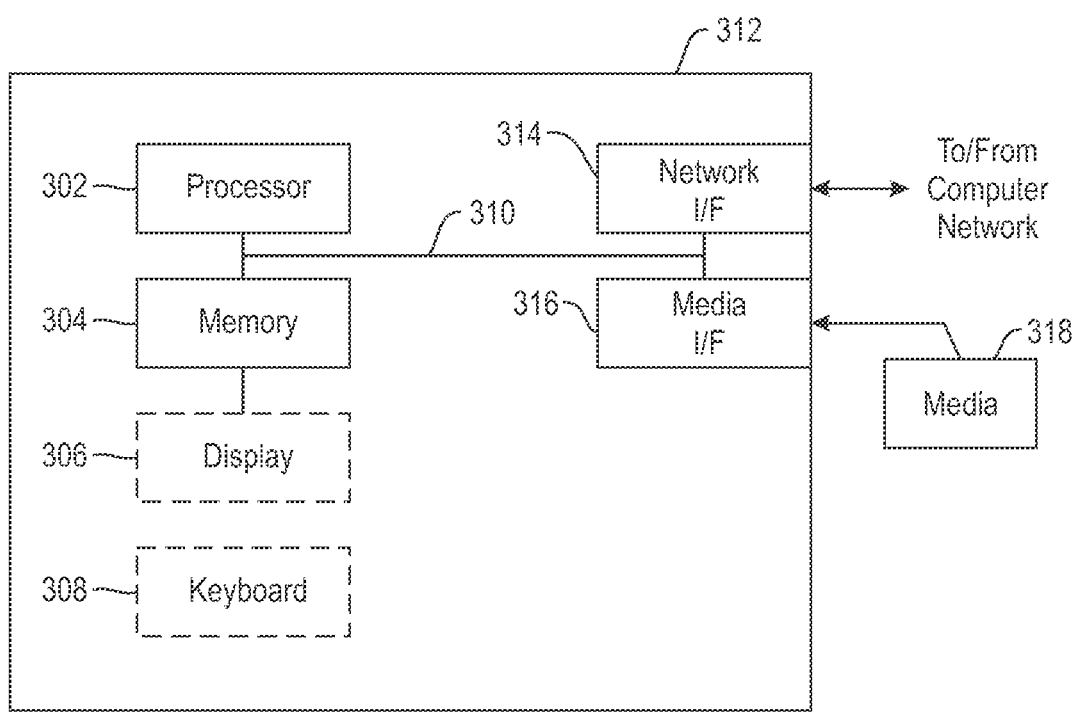
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, capturing and representing the intention of a user while performing actions on a user interface, translating and/or mapping user action to a logical assertion that expresses the semantics of the intention and using logical reasoning to infer new facts from the union of assertions to disambiguate solutions to problems in electrical grids.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method, comprising:
   receiving, from a plurality of phasor measurement units (PMUs) deployed on an electrical transmission grid, a plurality of PMU measurements;
   receiving, from a user interface, a selection of PMUs to remove PMU measurements generated by the selected PMUs from the user interface during at least one particular localized fault of the electrical transmission grid;
   based on receiving the selection of PMUs to remove PMU measurements generated by the selected PMUs from the user interface, generating a rule to remove PMU measurements based on the selection of the PMUs from the user interface when the at least one particular localized fault of the electrical transmission grid occurs;
   determining that the at least one localized fault occurred on the electrical transmission grid at a later time; and
   automatically removing any displayed PMU measurements generated by the selected PMUs from the user interface based on the rule thereby removing irrelevant PMU measurements.

2. The computer-implemented method of claim 1, wherein the selection of PMUs is received from a user interface communicatively linked to at least one computing device.

3. The computer-implemented method of claim 1, further comprising:
   logging the removal of the PMU measurements generated by the selected PMUs from the user interface when the at least one particular localized fault.

4. The computer-implemented method of claim 1, further comprising:
   receiving user validation of the rule via a user interface.

5. The computer-implemented method of claim 4, further comprising:
   updating a knowledge base with the rule based on the user validation.

6. The computer-implemented method of claim 1, further comprising providing a command to remove PMU measurements based on the selection of PMUs to the user interface.

7. The computer-implemented method of claim 1, comprising:
   asserting PMU measurements from the selected PMU as irrelevant data.

8. The computer-implemented method of claim 7, further comprising mapping the irrelevant data to one or more items of stored information.

9. A computer program product, the computer program product comprising a computer readable storage medium having program instructions embodied therewith, the program instructions executable by a device to cause the device to:
   receive, from a plurality of phasor measurement units (PMUs) deployed on an electrical transmission grid, a plurality of PMU measurements;
   receive, from a user interface, a selection of PMUs to remove PMU measurements generated by the selected PMUs from the user interface during at least one particular localized fault of the electrical transmission grid;
   based on receiving the selection of PMUs to remove PMU measurements generated by the selected PMUs from the user interface, generating a rule to remove PMU measurements based on the selection of the PMUs from the user interface when the at least one particular localized fault of the electrical transmission grid occurs;

determining that the at least one localized fault occurred on the electrical transmission grid at a later time; and automatically removing any displayed PMU measurements generated by the selected PMUs from the user interface based on the rule thereby removing irrelevant PMU measurements.

10. The computer program product of claim 9, wherein the selection of PMUs is received from a user interface communicatively linked to at least one computing device.

11. The computer program product of claim 9, wherein the program instructions are further executable by the device to cause the device to:

log the removal of the PMU measurements generated by the selected PMUs from the user interface when the at least one particular localized fault.

12. The computer program product of claim 9, wherein the program instructions are further executable to cause the device to:

receive user validation of the rule via a user interface.

13. The computer program product of claim 12, wherein the program instructions are further executable to cause the device to:

update a knowledge base with the rule based on the user validation.

14. The computer program product of claim 9, wherein the selection of the PMUs to remove PMU measurements comprises the program instructions are further executable to cause the device to provide a command to remove PMU measurements based on the selection of PMUs to the user interface.

15. A system comprising:

a memory; and at least one processor coupled to the memory and configured for:

receiving, from a plurality phasor measurement units (PMUs) deployed on an electrical transmission grid, a plurality of RTU measurements;

receiving, from a user interface, a selection of PMUs to remove PMU measurements generated by the selected PMUs from the user interface during at least one particular localized fault of the electrical transmission grid;

based on receiving the selection of PMUs to remove PMU measurements generated by the selected PMUs from the user interface, generating a rule to remove PMU measurements based on the selection of the PMUs from the user interface when the at least one particular localized fault of the electrical transmission grid occurs;

determining that the at least one localized fault occurred on the electrical transmission grid at a later time; and automatically removing any displayed PMU measurements generated by the selected PMUs from the user interface based on the rule thereby removing irrelevant PMU measurements.

* * * * *